United States Patent Office 3,471,502
Patented Oct. 7, 1969

3,471,502
AMINOPHENANTHRENE COMPOUNDS AND PROCESS FOR PREPARING THE SAME
Issei Iwai, Isao Seki, Haruhiko Minakami, Shinsaku Kobayashi, Satoru Inada, and Seiji Kumakura, Tokyo, Japan, assignors to Sankyo Company Limited, Tokyo, Japan
No Drawing. Filed Jan. 18, 1966, Ser. No. 521,432
Claims priority, application Japan, Jan. 20, 1965, 40/2,862
Int. Cl. C07d 29/20
U.S. Cl. 260—294.7                             4 Claims

ABSTRACT OF THE DISCLOSURE

Novel aminophenanthrene compounds of the formula

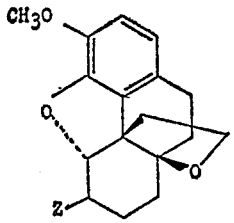

The symbol Z stands for a member selected from the group consisting of dimethylamino, 1-pyrrolidinyl, piperidino and morpholino. A process for preparing the new compounds is also disclosed. These compounds are useful as antihypertensive agents.

DESCRIPTION OF THE INVENTION

This invention relates to certain novel aminophenanthrene compounds and a process for preparing them. More particularly, this invention is concerned with an aminophenanthrene compound having the formula

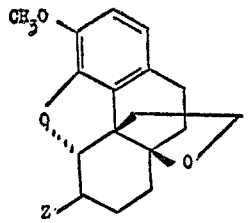

(I)

wherein Z is a member selected from the group consisting of dimethylamino, 1-pyrrolidinyl, piperidino and morpholino and also with a process for preparing such compounds.

The aminophenanthrene compounds of the above Formula I are novel compounds heretofore unknown in the prior art. They possess potent hypotensive activity and are useful as an antihypertensive agent. Among them, the aminophenanthrene compound of the above Formula I wherein Z represents piperidino radical exhibits remarkably potent hypotensive activity.

Therefore, it is an object of this invention to provide new and novel aminophenanthrene compounds of the Formula I which are very useful as an antihypertensive agent.

Another object of this invention is to provide a process for preparing the aminophenanthrene compounds of the Formula I, which are employed as a valuable medicine.

These and other objects of this invention will be apparent from the following detailed disclosure of this invention.

In accordance with this invention, the aminophenanthrene compounds of the Formula I can be prepared by the process which comprises reacting 4α,5-epoxy-6-methoxy-3-oxo-1,2,3,4,9,10,12,13 - octahydrophenanthro [4b,8a-b] furan, hereinafter referred to frequently as "dihydrocodeone," represented by the structural formula

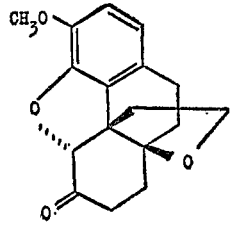

with an amine of the formula

HZ                                      (II)

wherein Z is as defined above to form an intermediate enamine of the formula

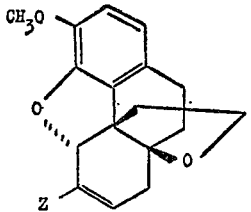

(III)

wherein Z is as defined above and reducing the latter product (III) to form the desired product of the Formula I.

The starting materials have been disclosed in "Annalen der Chemie," vol. 452, p. 249 (1927).

In carrying out the process of this invention, the first step, namely amination step is preferably conducted by reacting dihydrocodeone with an amine of the Formula II in the presence of a dehydrating catalyst in an inert organic solvent. Suitable inert organic solvents are benzene, toluene, xylenes and the like. Representative examples of dehydrating catalysts include p-toluenesulfonic acid, anhydrous calcium chloride and anhydrous sodium sulfate. Other conventional dehydrating catalysts may also be employed, if desired. Furthermore, this step may be preferably carried out by removing water formed during the reaction by way of azeotropic distillation as azeotropic mixture of water and the inert organic solvent employed. The reaction temperature and time of this step are not critical features of this invention, but it is desirable to carry out this step at reflux temperature of the solvent employed for about 0.5–10 hours. The intermediate enamine of the Formula III may be isolated from the reaction mixture by a known procedure and then employed in the next step. For instance, after completion of the reaction, the reaction mixture is cooled, washed with aqueous alkali, for example, aqueous sodium carbonate and then water, and finally evaporated to dryness to give the desired intermediate. Alternatively, the reaction mixture containing the enamine may be employed as such in the next step, without isolation of the enamine.

The second step of the present process, namely reduction step is preferably carried out by way of a conventional reduction technique known to accomplish the hydrogenation of a carbon-to-carbon double bond except a catalytic reduction procedure. Most preferably, there are employed reduction techniques with formic acid as well as with sodium borohydride. When the above stated known technique is used, reaction conditions will be easily selected by those skilled in the art.

After completion of the reaction, the end product of this invention may be recovered from the reaction mixture by any of the conventional methods. For instance, where formic acid is employed as a reducing agent, the reaction mixture is poured into water, the resulting mixture is made alkaline with alkali and extracted with a suitable organic solvent, for example, benzene to obtain the desired product. Where sodium borohydride is employed as a reducing agent, the reaction mixture is concentrated, the residue is dissolved in a dilute acid, the resulting solution is made alkaline and extracted with a suitable organic solvent, for example, benzene to obtain the desired product. The desired product thus obtained may be further purified, for example, by a chromatographic procedure.

Moreover, those acid addition salts of the present aminophenanthrene compounds of the Formula I are intended to be within the purview of this invention. These acid addition salts can be easily produced by a conventional method, for example, by reacting an aminophenanthrene base with an acid such as mineral acid, for example, hydrochloric, hydrobromic or sulfuric acids or organic acid, for example, maleic, succinic or tartaric acids.

The following examples serve to illustrate, but are not intended to limit the scope of this invention.

Example 1.—6β-(1-pyrrolidinyl)-6-deoxo-dihydrocodeone [=4α,5 - epoxy - 6 -methoxy - 3β - (1 - pyrrolidinyl)-1,2,3,4,9,10,12,13 - octahydrophenanthro [4b,8a - b] furan]

To a solution of 2.86 g. of dihydrocodeone in 50 ml. of benzene are added 2.5 ml. of pyrrolidine and 0.3 g. of p-toluenesulfonic acid and the mixture is heated under reflux for 1.5 hours. The water which forms during the reaction is removed by azeotropic distillation. After completion of the reaction, the reaction mixture is ice-cooled, washed with 10 ml. of 10% aqueous sodium carbonate and then water, dried over anhydrous sodium sulfate and evaporated to dryness.

To 3.7 g. of the residual enamine is added 0.7 ml. of formic acid and the mixture is heated at 110° C. for 1 hour. The reaction mixture is poured into diluted hydrochloric acid and the resulting mixture is washed with benzene and adjusted to pH 9.0 with aqueous ammonia and finally extracted with benzene. The benzene extract is washed with water, dried over anhydrous sodium sulfate and chromatographed through alumina column (10 g.). The column is then washed with n-hexane and eluted with benzene to give 2.8 g. of the desired product as crystalline materials, which is recrystallized from ether to yield the pure product, melting at 117–118° C.

Analysis.—Calculated for $C_{21}H_{27}NO_3$: C, 73.82; H, 7.97; N, 4.10. Found: C, 73.92; H, 7.88; N, 4.16.

Example 2.—6α-(1-pyrrolidinyl)-6-deoxo-dihydrocodeone

To a solution of 3.7 g. of the enamine, obtained from dihydrocodeone and pyrrolidine as in Example 1, in 100 ml. of methanol is added 1 g. of sodium borohydride with stirring and the stirring is continued at 30–40° C. for 2 hours. Then, 3 ml. of acetic acid is added to the stirred mixture and the resulting mixture is heated under reflux for additional 3 hours. After completion of the reaction, the methanol is distilled off under reduced pressure, the residue is dissolved in dilute hydrochloric acid and the solution thus obtained is washed with benzene. The aqueous layer is adjusted to pH 9.0 with aqueous ammonia and the alkaline layer is extracted with benzene. The benzene extract is washed with water, dried over anhydrous sodium sulfate, the benzene is distilled off and then the residue is dissolved in n-hexane. The resulting solution is chromatographed through alumina column (the alumina being employed fifteen times as large in amount as the residue) and the column is eluted with n-hexane to give the desired product, melting at 93° C.

Analysis.—Calculated for $C_{21}H_{27}NO_3$: C, 73.82; H, 7.97; N, 4.16. Found: C, 73.68; H, 7.97; N, 3.98.

Example 3.—6α - morpholino - 6 - deoxo - dihydrocodeone [=4α,5 - epoxy - 6 - methoxy - 3α - morpholino - octahydrophenanthro [4b,2a-b] furan]

Following the same procedure except that the equal amount of morpholine is employed in place of pyrrolidine, there are obtained 3.35 g. of the enamine, which is recrystallized from methanol to yield the pure enamine, melting at 131–133° C.

Analysis.—Calculated for $C_{21}H_{25}NO_4$: C, 70.96; H, 7.09; N, 3.94. Found: C, 70.65; H, 7.06; N, 4.07.

A mixture of 1.7 g. of the enamine obtained as described above and 0.25 ml. of formic acid is treated in the same manner as in Example 1, thereby yielding 0.25 g. of the desired product. The corresponding hydrochloride melts at 244–246° C. with decomposition.

Analysis.—Calculated for $C_{21}H_{28}NO_4Cl$: C, 64.02; H, 7.16; N, 3.56; Cl, 9.01. Found: C, 63.69; H, 7.17; N, 3.77; Cl, 9.12.

Example 4.—6α - piperidino - 6 - deoxo - dihydrocodeone [=4α,5 - epoxy - 6 - methoxy - 3α - piperidino - octahydrophenanthro [4b,8a-b] furan]

Following the same procedure except that the equal amount of piperidine is employed in place of pyrrolidine, there are obtained 3.15 g. of the enamine.

A mixture of 3.15 g. of the enamine obtained as described above and 0.5 ml. of formic acid is treated in the same manner as in Example 1, thereby yielding 0.16 g. of the desired product. The corresponding hydrochloride melts at 265–268° C. with decomposition.

Analysis.—Calculated for $C_{22}H_{30}NO_3Cl$: C, 67.41; H, 7.71; N, 3.57; Cl, 9.06. Found: C, 66.84; H, 7.71; N, 3.43; Cl, 9.25.

Example 5.—6α - dimethylamino - 6 - deoxo - dihydrocodeone [=4α,5 - epoxy - 6 - methoxy - 3α - dimethylamino-octahydrophenanthro [4b,8a-b] furan]

A mixture of 2.86 g. of dihydrocodeone, 20 g. of dimethylamine hydrochloride, 20 g. of anhydrous sodium carbonate, 70 g. of anhydrous sodium sulfate and 3 g. of p-toluenesulfonic acid in 200 ml. of benzene is heated under reflux for 7 hours. After completion of the reaction, the reaction mixture is cooled, filtered to remove the inorganic materials and then the filtrate is treated in the same manner as in Example 1 to give 2.8 g. of the intermediate enamine.

A mixture of 2.8 g. of the enamine obtained as described above and 0.6 ml. of formic acid is treated in the same manner as in Example 1 to give 0.5 g. of the desired product. The corresponding hydrochloride melts at 247.5–249.5° C. with decomposition.

Analysis.—Calculated for $C_{19}H_{26}NO_3Cl$: C, 64.84; H, 7.45; N, 3.98; Cl, 10.09. Found: C, 64.65; H, 7.37; N, 3.98; Cl, 10.26.

What is claimed is:
1. A compound selected from the group of compounds of the formula

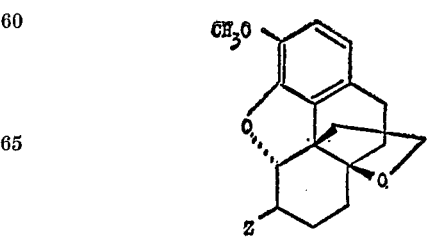

wherein Z is a member selected from the group consisting of dimethylamino, 1-pyrrolidinyl, piperidino and morpholino.

1. 4α,5-epoxy-6-methoxy-3-piperidino - 1,2,3,4,9,10,12, 13-octahydrophenanthro [4b,8a-b] furan.

3. A process for preparing a compound of the formula

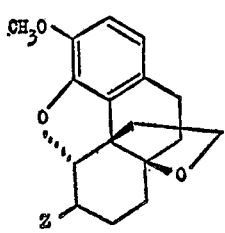

wherein Z is a member selected from the group consisting of dimethylamino, 1-pyrrolidinyl, piperidino and morpholino which comprises reacting a compound of the formula

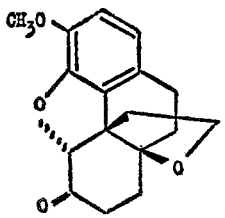

with a compound of the formula

HZ wherein Z is as defined above to form a compound of the formula

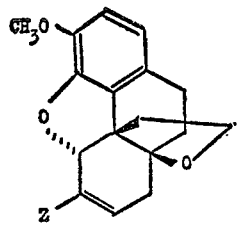

wherein Z is as defined above and reducing the latter product.

4. A process for preparing 4α,5-epoxy-6-methoxy-3-piperidino-1,2,3,4,9,10,12,13-octahydrophenanthro [4b,8a-b] furan which comprises reacting 4α,5-epoxy-6-methoxy-3-oxo-1,2,3,4,9,10,12,13 - octahydrophenanthro [4b,8a-b] furan with piperidine to form 4α,5-epoxy-6-methoxy-3-piperidino-1,4,9,10,12,13-hexahydrophenanthro [4b,8a-b] furan and reducing the latter compound with formic acid.

References Cited

UNITED STATES PATENTS 3,301,866   6/1967   Draper _____ 260—294.7

HENRY R. JILES, Primary Examiner

R. T. BOND, Assistant Examiner

U.S. Cl. X.R.

260—247.2, 247.7, 294, 326.3, 326.5, 346.2; 424—248, 267, 274